United States Patent
Ong et al.

(10) Patent No.: US 12,008,035 B2
(45) Date of Patent: Jun. 11, 2024

(54) FACILITATING VIDEO SEARCH

(71) Applicant: Gracenote Media Services, LLC, New York, NY (US)

(72) Inventors: Edwin Seng Eng Ong, San Francisco, CA (US); Aleksandra R. Vikati, San Francisco, CA (US)

(73) Assignee: Gracenote Media Services, LLC, New York, NY (US)

( * ) Notice: Subject to any disclaimer, the term of this patent is extended or adjusted under 35 U.S.C. 154(b) by 0 days.

(21) Appl. No.: 17/967,530

(22) Filed: Oct. 17, 2022

(65) Prior Publication Data

US 2023/0036399 A1    Feb. 2, 2023

Related U.S. Application Data

(63) Continuation of application No. 16/428,280, filed on May 31, 2019, now Pat. No. 11,487,816, which is a (Continued)

(51) Int. Cl.
*G06F 16/71* (2019.01)
*G06F 16/78* (2019.01)
(Continued)

(52) U.S. Cl.
CPC .......... *G06F 16/71* (2019.01); *G06F 16/7867* (2019.01); *G06F 16/9535* (2019.01);
(Continued)

(58) Field of Classification Search
CPC .. G06F 16/71; G06F 16/7867; G06F 16/9535; H04N 21/23; H04N 21/23109; H04N 21/4782
See application file for complete search history.

(56) References Cited

U.S. PATENT DOCUMENTS

| | | | |
|---|---|---|---|
| 5,436,653 A | 7/1995 | Ellis et al. | |
| 6,549,922 B1 | 4/2003 | Srivastava et al. | |
| (Continued) | | | |

FOREIGN PATENT DOCUMENTS

| | | |
|---|---|---|
| CN | 101639841 | 2/2010 |
| CN | 102508893 | 6/2012 |

OTHER PUBLICATIONS

Sehgal, "Profiling topics on the Web for Knowledge discovery," Phd (Doctor of Philosophy) thesis, [http://ir.uiowa.edu/etd/215], University of Iowa, 2007, 159 pages.
(Continued)

*Primary Examiner* — Nnenna N Ekpo
(74) *Attorney, Agent, or Firm* — McDonnell Boehnen Hulbert & Berghoff LLP

(57) ABSTRACT

Methods and apparatus for facilitating video search are disclosed. An example apparatus includes one or more processors to execute instructions to process first metadata associated with video to identify the video as corresponding to an episode of a television show, the video made available by a first device. The example one or more processors are to update a database to include first information concerning the episode of the television show based on the first metadata and access second metadata associated with the video, the second metadata collected from a second device. Additionally, the example one or more processors are to process the second metadata to determine second information about the episode of the television show and augment the database with the second information about the episode of the television show.

12 Claims, 5 Drawing Sheets

Related U.S. Application Data continuation of application No. 15/166,918, filed on May 27, 2016, now Pat. No. 10,509,822, which is a continuation of application No. 14/259,083, filed on Apr. 22, 2014, now Pat. No. 9,378,280, which is a continuation of application No. 11/891,301, filed on Aug. 8, 2007, now Pat. No. 8,745,684.

(60) Provisional application No. 60/821,704, filed on Aug. 8, 2006.

(51) Int. Cl.
  *G06F 16/9535* (2019.01)
  *H04N 21/23* (2011.01)
  *H04N 21/231* (2011.01)
  *H04N 21/4782* (2011.01)
  *H04N 21/84* (2011.01)

(52) U.S. Cl.
  CPC ....... *H04N 21/23* (2013.01); *H04N 21/23109* (2013.01); *H04N 21/4782* (2013.01); *H04N 21/84* (2013.01)

(56) References Cited

U.S. PATENT DOCUMENTS

| | | |
|---|---|---|
| 6,718,324 B2 | 4/2004 | Edlund et al. |
| 6,847,977 B2 | 1/2005 | Abajian |
| 6,925,197 B2 | 8/2005 | Dimitrova et al. |
| 6,973,663 B1 | 12/2005 | Brown et al. |
| 7,085,778 B2 | 8/2006 | Reed et al. |
| 7,124,149 B2 | 10/2006 | Smith et al. |
| 7,162,691 B1 | 1/2007 | Chatterjee et al. |
| 7,305,692 B2 | 12/2007 | Blackketter et al. |
| 7,308,464 B2 | 12/2007 | Nowitz et al. |
| 7,546,289 B2 | 6/2009 | Westphal |
| 7,657,151 B2 | 2/2010 | Goodwin et al. |
| 7,925,590 B2 | 4/2011 | Jain |
| 8,561,108 B2 | 10/2013 | Bhogal et al. |
| 8,645,354 B2 | 2/2014 | Kong et al. |
| 8,666,918 B2 | 3/2014 | Sikora et al. |
| 8,719,866 B2 | 5/2014 | Reyna et al. |
| 8,745,684 B1 | 6/2014 | Ong et al. |
| 9,166,714 B2 | 10/2015 | Barve et al. |
| 9,258,609 B2 | 2/2016 | Odryna et al. |
| 9,378,280 B2 | 6/2016 | Ong et al. |
| 9,398,350 B1 | 7/2016 | Ong et al. |
| 9,507,823 B2 | 11/2016 | Hegde et al. |
| 9,684,719 B2 | 6/2017 | Ostrovsky-Berman et al. |
| 10,229,198 B2 | 3/2019 | Ong et al. |
| 10,509,822 B2 | 12/2019 | Ong et al. |
| 11,188,591 B2 | 11/2021 | Ong et al. |
| 2002/0078045 A1 | 6/2002 | Dutta |
| 2002/0188943 A1 | 12/2002 | Freeman et al. |
| 2003/0028896 A1 | 2/2003 | Swart et al. |
| 2003/0101415 A1 | 5/2003 | Chang |
| 2004/0003403 A1 | 1/2004 | Marsh |
| 2004/0015490 A1 | 1/2004 | Snyder et al. |
| 2004/0170392 A1 | 9/2004 | Lu et al. |
| 2005/0106543 A1 | 5/2005 | Day et al. |
| 2005/0196139 A1 | 9/2005 | Blackketter et al. |
| 2006/0026647 A1 | 2/2006 | Potrebic et al. |
| 2006/0146436 A1 | 7/2006 | Goodwin et al. |
| 2006/0236343 A1 | 10/2006 | Chang |
| 2007/0078884 A1* | 4/2007 | Ott ................ G06F 16/958 707/999.102 |
| 2010/0057694 A1 | 3/2010 | Kunjithapatham et al. |
| 2010/0217781 A1 | 8/2010 | Benhadda et al. |
| 2011/0145847 A1 | 6/2011 | Barve et al. |
| 2012/0233640 A1 | 9/2012 | Odryna et al. |
| 2012/0246156 A1 | 9/2012 | Gupta et al. |
| 2014/0379731 A1 | 12/2014 | Dixit et al. |
| 2015/0127626 A1 | 5/2015 | Park et al. |
| 2015/0356195 A1 | 12/2015 | Kilzer |
| 2016/0358096 A1 | 12/2016 | Bannur et al. |
| 2019/0286650 A1 | 9/2019 | Ong et al. |
| 2022/0114211 A1 | 4/2022 | Ong et al. |

OTHER PUBLICATIONS

Jain et al., "Metadata in Video Databases," ACM Sigmod Record 23.4 (1994); 27-33, 7 pages.

Smith et al., " An Image and Video Search Engine for the World-Wide Web," Storage and Retrieval for Image and Video Databases (SPIE), 1997, 15 pages.

United States Patent and Trademark Office, "Non-Final Office Action," issued in connection with U.S. Appl. No. 15/166,918, dated Sep. 26, 2018, 15 pages.

United States Patent and Trademark Office, "Notice of Allowance and Fee(s) Due," issued in connection with U.S. Appl. No. 15/166,918, dated Mar. 13, 2019, 9 pages.

United States Patent and Trademark Office, "Notice of Allowability," issued in connection with U.S. Appl. No. 15/166,918, dated Apr. 29, 2019, 2 pages.

United States Patent and Trademark Office, "Notice of Allowance and Fee(s) Due," issued in connection with U.S. Appl. No. 15/166,918, dated Aug. 21, 2019, 8 pages.

United States Patent and Trademark Office, "Non-Final Office Action," issued in connection with U.S. Appl. No. 11/891,301, dated Mar. 23, 2010, 10 pages.

United States Patent and Trademark Office, "Final Office Action," issued in connection with U.S. Appl. No. 11/891,301, dated Sep. 17, 2010, 14 pages.

United States Patent and Trademark Office, "Notice of Allowance and Fee(s) Due," issued in connection with U.S. Appl. No. 11/891,301, dated Feb. 6, 2014, 12 pages.

United States Patent and Trademark Office, "Non-Final Office Action," issued in connection with U.S. Appl. No. 14/259,083, dated Aug. 5, 2015, 5 pages.

United States Patent and Trademark Office, "Notice of Allowance and Fee(s) Due," issued in connection with U.S. Appl. No. 14/259,083, dated Mar. 8, 2016, 5 pages.

United States Patent and Trademark Office, "Non-Final Office Action," issued in connection with U.S. Appl. No. 16/428,280, dated Oct. 13, 2021, 9 pages.

United States Patent and Trademark Office, "Final Office Action," issued in connection with U.S. Appl. No. 16/428,280, dated Feb. 16, 2022, 13 pages.

United States Patent and Trademark Office, "Advisory Action," issued in connection with U.S. Appl. No. 16/428,280, dated Apr. 29, 2022, 3 pages.

United States Patent and Trademark Office, "Notice of Allowance and Fee(s) Due," issued in connection with U.S. Appl. No. 16/428,280, dated Aug. 1, 2022. 8 pages.

Yeo et al., "Retrieving and Visualizing Video," Communications of the ACM, vol. 40, Issue 12, Dec. 1997, 10 pages.

United States Patent and Trademark Office, "Notice of Allowance and Fee(s) Due," issued in connection with U.S. Appl. No. 15/187,663, dated Oct. 26, 2018, 15 pages.

United States Patent and Trademark Office, "Non-Final Office Action," issued in connection with U.S. Appl. No. 13/460,477, dated Mar. 14, 2013, 12 pages.

United States Patent and Trademark Office, "Final Office Action," issued in connection with U.S. Appl. No. 13/460,477, dated Aug. 22, 2013, 12 pages.

United States Patent and Trademark Office, "Non-Final Office Action," issued in connection with U.S. Appl. No. 13/460,477, dated Feb. 4, 2015, 13 pages.

United States Patent and Trademark Office, "Final Office Action," issued in connection with U.S. Appl. No. 13/460,477, dated May 28, 2015, 13 pages.

United States Patent and Trademark Office, "Notice of Allowance and Fee(s) Due, " issued in connection with U.S. Appl. No. 13/460,477, dated Apr. 18, 2016, 7 pages.

(56) References Cited

OTHER PUBLICATIONS

United States Patent and Trademark Office, "Non-Final Office Action," issued in connection with U.S. Appl. No. 16/297,329, dated Apr. 14, 2020, 11 pages.

United States Patent and Trademark Office, "Final Office Action," issued in connection with U.S. Appl. No. 16/297,329, dated Sep. 9, 2020, 13 pages.

United States Patent and Trademark Office, " Advisory Action," issued in connection with U.S. Appl. No. 16/297,329, dated Nov. 18, 2020, 2 pages.

United States Patent and Trademark Office, "Non-Final Office Action," issued in connection with U.S. Appl. No. 16/297,329, dated Mar. 31, 2021, 14 pages.

United States Patent and Trademark Office, "Notice of Allowance and Fee(s) Due, " issued in connection with U.S. Appl. No. 16/297,329, dated Jul. 21, 2021, 8 pages.

United States Patent and Trademark Office, "Notice of Allowability," issued in connection with U.S. Appl. No. 16/297,329, dated Nov. 3, 2021, 2 pages.

\* cited by examiner

FACILITATING VIDEO SEARCH

RELATED APPLICATIONS

This patent arises from a continuation of U.S. patent application Ser. No. 16/428,280, now U.S. Pat. No. 11,487,816, entitled FACILITATING VIDEO SEARCH, filed May 31, 2019, which is a continuation of U.S. patent application Ser. No. 15/166,918, now U.S. Pat. No. 10,509,822, entitled FACILITATING VIDEO SEARCH, filed May 27, 2016, which is a continuation of U.S. patent application Ser. No. 14/259,083, now U.S. Pat. No. 9,378,280, entitled FACILITATING VIDEO SEARCH, filed Apr. 22, 2014, which is a continuation of U.S. patent application Ser. No. 11/891,301, now U.S. Pat. No. 8,745,684, entitled FACILITATING VIDEO SEARCH, filed Aug. 8, 2007, which claims the benefit of U.S. Provisional Patent Application No. 60/821,704, entitled TECHNIQUES FOR AUGMENTING THE TEXT INFORMATION AVAILABLE TO VIDEO SEARCH ENGINES, filed Aug. 8, 2006. U.S. patent application Ser. No. 16/428,280; U.S. patent application Ser. No. 15/166,918; U.S. patent application Ser. No. 14/259,083; U.S. patent application Ser. No. 11/891,301; and U.S. Provisional Patent Application No. 60/821,704 are hereby incorporated herein by reference in their entireties for all purposes. Priority to U.S. patent application Ser. No. 16/428,280; U.S. patent application Ser. No. 15/166,918; U.S. patent application Ser. No. 14/259,083; U.S. patent application Ser. No. 11/891,301; and U.S. Provisional Patent Application No. 60/821,704 is hereby claimed.

BACKGROUND

There is an increasingly large volume of videos being posted to the Internet and to the World Wide Web ("web"). Videos can now be found on a wide variety of web sites. Videos are also found on the non-web portions of the Internet, such as on music stores, on peer-to-peer file sharing networks, and on Internet-enabled set top boxes.

Video search engines have been developed to search for Internet videos. Some video search engines allow searching for videos that are on web sites. Some video search engines allow searching for videos that are on peer-to-peer networks.

A common technique for web video search engines is to locate the text describing a particular video ("video description"), index the text, and subsequently return the associated video when a user's search query matches the video description. The video description may be extracted from the web page on which the video is embedded or linked from which it is linked or from the metadata of the video file. The video description is often short, limited, and/or vague. Therefore, a user's search query may not necessarily return the desired search results. For peer-to-peer video search engines, queries may be set to match against the filename or metadata of the video. The metadata may include a video description that is similar to web video descriptions in that it is short, limited, and/or vague.

BRIEF DESCRIPTION OF THE DRAWINGS

Various embodiments of the invention are disclosed in the following detailed description and the accompanying drawings.

DETAILED DESCRIPTION

Figure 1:
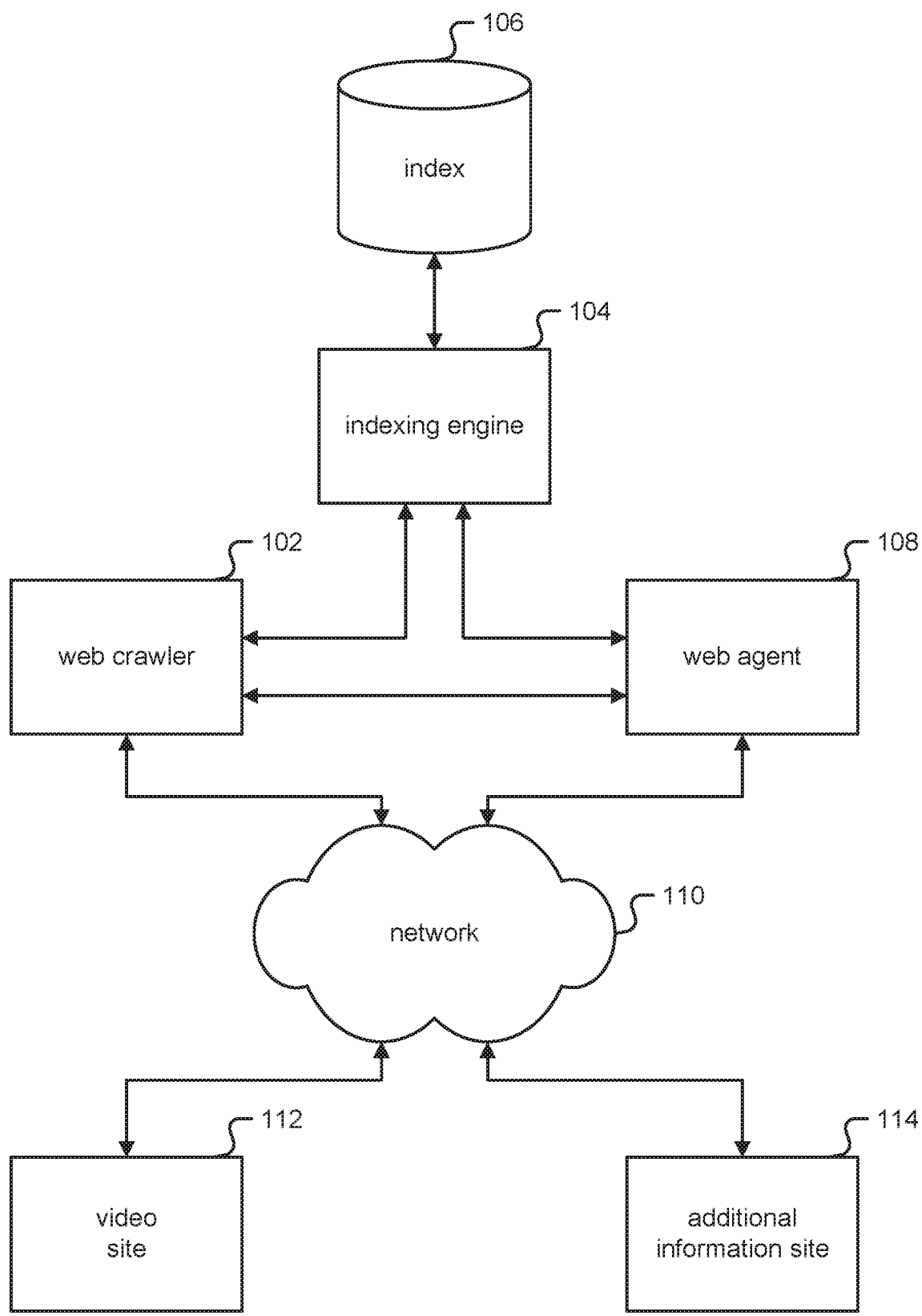
FIG. 1 is a block diagram illustrating an embodiment of a system for facilitating video search.

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

For a large set of videos on computer networks, there are fuller descriptions of, and additional information for, the videos available elsewhere on a network or in other electronic forms. For example, for many videos of television shows, episode recaps and summaries are often readily available on the web on display pages other than the one in which a video is included and/or otherwise made available, e.g., via a link.

Similarly, related information is available for many other types of videos as well, including news articles for news videos, "play-by-play" recaps for sports videos, scripts for movies, cast and crew information for entertainment videos, player and team information for sports videos, and so forth. However, video search engines do not programmatically utilize such available information in generating search index entries for video available on the web and/or processing queries.

Using information from a display page other than a display page in which a video content is located and/or otherwise made available to facilitate video search is disclosed. In some embodiments, when indexing a video embedded on a web page or linked to from a web page, a program first locates the available video description, filename, and any available metadata ("video data.") A set of rules is applied to the video data to classify the video. If a video is successfully classified, an agent uses the classification to fetch additional information data associated with the video. In some embodiments, the additional information associated with the video is used to generate, at least in part, a video search index entry associated with the video. In various embodiments, the additional information may be used directly to generate the index entry and/or used to find other information, such as a further description associated with the video, which other information is then used to generate the index entry. When a user subsequently queries a video search engine with the video search index entry, the query term is matched not only against the original video description, but also against the indexed additional and/or other information.

FIG. 1 is a block diagram illustrating an embodiment of a system for facilitating video search. In the example shown, web crawler 102 locates video on computer networks. Web crawler 102 is connected to an indexing engine 104 that generates and maintains an index 106. Web crawler 102 is connected to web agent 108 which obtains additional information associated with videos. In some embodiments, web crawler 102 and web agent 108 may be combined in one system or program. Web crawler 102 and web agent 108 are also connected to a network 110; a public or private network and/or combination thereof, for example the Internet, an Ethernet, serial/parallel bus, intranet, Local Area Network ("LAN"), Wide Area Network ("WAN"), and other forms of connecting multiple systems and/or groups of systems together.

The network 110 connects web crawler 102 and web agent 108 with a variety of different web sites each of which may include or reference video content. In the example shown in FIG. 1, a video site 112 comprises one or more display pages with a video and a video data. In the example shown in FIG. 1, in a location other than the display page on video site 112, additional information data associated with the video is stored on additional information site 114. On some sites, the additional information data may also be stored on video site 112 on a separate display page. In some embodiments, the additional information data may also be stored locally to web agent 108.

Figure 2:
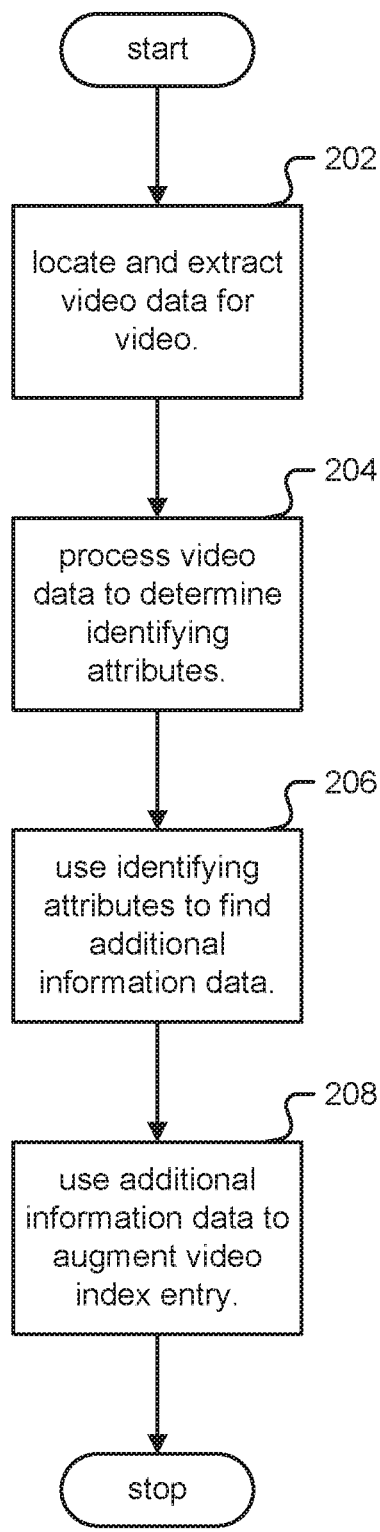
FIG. 2 is a flowchart illustrating an embodiment of a process to facilitate video search with additional information data.

FIG. 2 is a flowchart illustrating an embodiment of a process to facilitate video search with additional information data. The process may be implemented in web crawler 102 and web agent 108.

In step 202, web crawler 102 locates a video on a display page on video site 112 to index in index database 106. The video may be embedded in the display page or linked to from the display page. Web crawler 102 locates and extracts the video data associated with the video.

In step 204, web crawler 102 processes the video data to determine identifying attributes. These identifying attributes are classified in order to associate the video as belonging to an isolated, unique episode or event for which additional information is available. For example, for a video related to a television show, the identifying attributes may be classified to associate the video as belonging a specific episode of the television show.

In step 206, if a video is successfully classified, the web agent 108 can then fetch additional information for the video from other display pages. For example, for a video related to a television show, additional information may include a full episode synopsis from a local data source, another display page on video site 112 or an additional information site 114.

In step 208, the additional information data associated with the video is used to augment the body of information used to generate and/or supplement an index entry for the video. In some embodiments the additional information data associated with the video and/or other information that the additional information is used to retrieve is processed by indexing engine 104 and added to index 106.

For example, the additional information associated with a video may be an episode number from a third party database. The episode number may then be used to retrieve other information from a different display page, for example a more full description of that episode. Both the additional information and other information are then used to augment the text used to generate the index entry for the video.

When a user subsequently queries the index 106 using a video search engine, the query term is matched not only against the original video data, but also against the indexed additional and/or other information. In some embodiments, a weighting equation may be built to appropriately weight matches to index terms generated based on additional and/or other information differently, e.g., less heavily, than matches based on the original video description and/or other video data.

Figure 3:
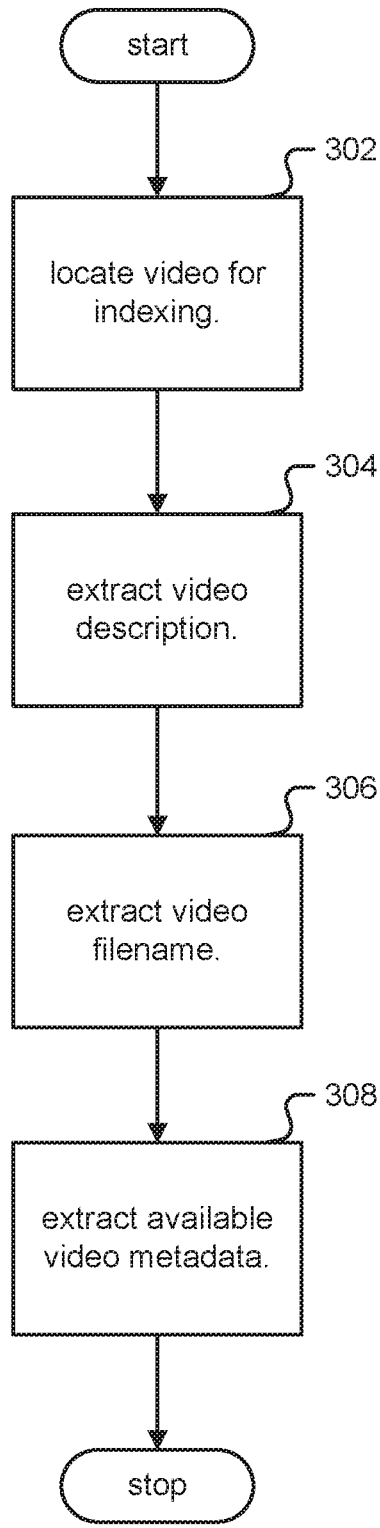
FIG. 3 is a flowchart illustrating an embodiment of a process to locate and extract video data.

FIG. 3 is a flowchart illustrating an embodiment of a process to locate and extract video data. In some embodiments, the process of FIG. 3 is included in 202 of FIG. 2. The process may be implemented in web crawler 102.

In step 302, the web crawler locates and identifies the video for indexing. In step 304, the video description associated with the video may be extracted by using one of many techniques, including but not limited to using regular expressions, Document Object Model (DOM) tree traversal, and other methods to locate one or more blocks of text. For example, a program can be developed to locate the text string enclosed in <p> tags immediately after the <embed> tags. In some embodiments, different rules may be used to locate video descriptions on different websites because of different layouts and formats of different web pages.

In step 306, the filename of the video is extracted. In step 308, any available metadata may be extracted. Video descriptions may not be available, for example, with video on peer-to-peer networks or with videos hosted on web pages with no available text describing the video. In such cases, only the filename and/or any available metadata is extracted.

Figure 4:
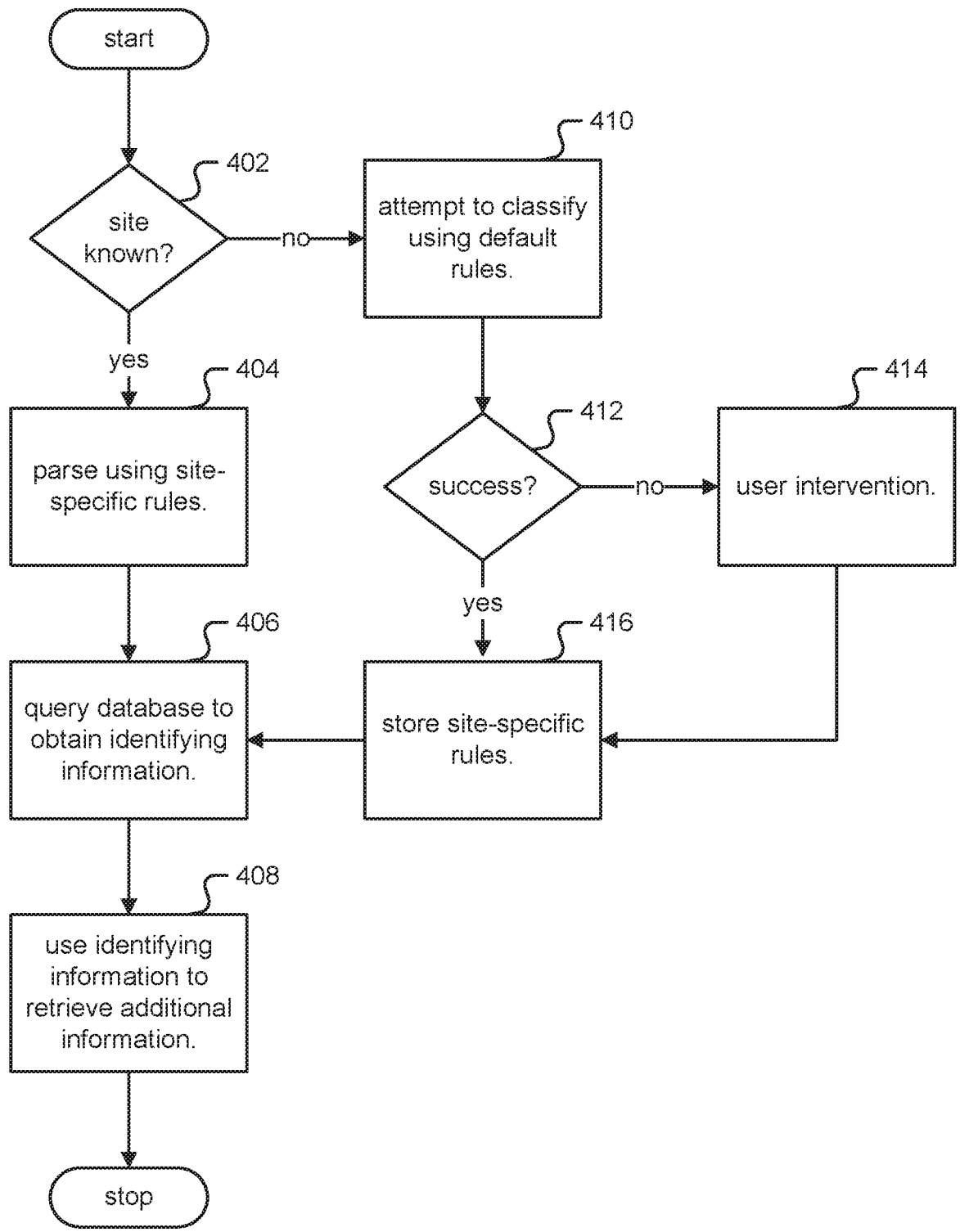
FIG. 4 is a flowchart illustrating an embodiment of a process to find additional information data associated with a video.

FIG. 4 is a flowchart illustrating an embodiment of a process to find additional information data associated with a video. In some embodiments, the process of FIG. 4 is included in 204 and 206 of FIG. 2. The process may be implemented in web crawler 102 and web agent 108.

If it is determined in step 402 that the web site displaying the display page with the video has been previously traversed and therefore is "known" by web crawler 102, then control is transferred to step 404. Otherwise, control is transferred to step 410.

In step 404, the site-specific rules are used to parse the video data. In some embodiments the set of parsing rules is applied to obtain the name of show, the name of the episode, and the airdate of the episode. For example, the video data for a video related to a television show may include the video description "Star Trek Moment—'Tomorrow' (Airdate: Feb. 1, 1968)," and the parsing rules obtain the name of the show as "Star Trek", the name of the episode as "Tomorrow" and the airdate of the episode as Feb. 1, 1968.

In step 406, a database is queried with the results of the parsing in 404 to obtain identifying information about the video. In some embodiments, a video classified with the name of the show, the name of the episode, and the airdate, can be programmatically matched to a unique episode by querying an episode database that includes the name of the show, the name of the episode, the season number, and the episode number. In some embodiments, the season number can be deduced from the name of the show and the airdate of the episode. For example, a video associated with a television show called "Star Trek", an episode "Tomorrow" and the airdate Feb. 1, 1968 may be classified as matching season 2, episode 18 of the show "Star Trek". In some embodiments an episode database may be available online or in other electronic forms. For other types of videos such as sports and news, similar classification rules are developed to obtain a match against a unique event.

In step 408, web agent 108 retrieves additional information associated with the video based on the identifying information in 406. For example, if the video has been identified as matching season 2, episode 18 of the show "Star Trek", the web agent 108 fetches a full episode recap of season 2, episode 18 of "Star Trek" from a local data source or from a source on the Internet. In some embodiments the web agent 108 conducts an automatic form submission at a web-based episode database and subsequently extract the resulting episode recap. In some embodiments the web agent 108 may retrieve one or multiple pieces of additional information from one or multiple sources.

In step 410, a set of default rules is used to parse the video data. If it is determined in step 412 that the video data is successfully parsed to obtain classifying information, then control is transferred to step 416. Otherwise, control is transferred to step 414. In step 414, user intervention is requested to manually establish rules to parse the video data. In step 416, the rules are stored as site-specific rules for future processing.

Figure 5:
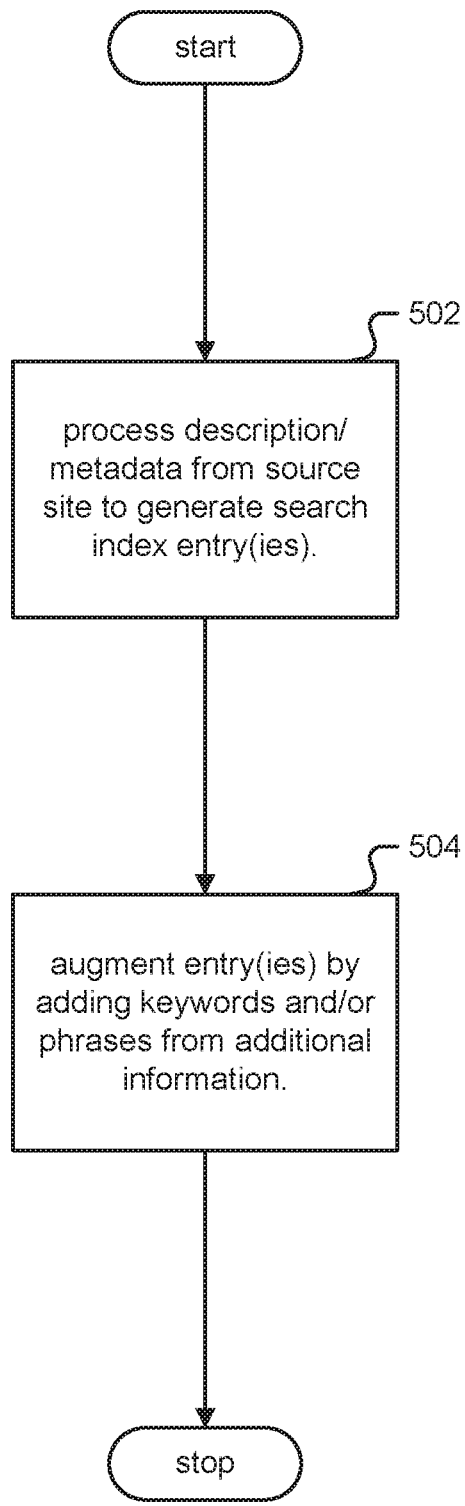
FIG. 5 is a flowchart illustrating an embodiment of a process to augment a video index entry.

FIG. 5 is a flowchart illustrating an embodiment of a process to augment a video index entry. In some embodiments, the process of FIG. 4 is included in 208 of FIG. 2. The process may be implemented in web crawler 102.

In step 502, the web crawler 102 processes the video description, filename and metadata to generate one or more search index entries. For example, a video with video description "Star Trek Moment—'Tomorrow' (Airdate: Feb. 1, 1968)" will generate a search index entry associating the video with searches for each word or number in the video description.

In step 504, the web crawler 102 augments one or more search index entries by adding keywords and/or phrases from the additional information associated with the video. For example, a video with video description "Star Trek Moment—'Tomorrow' (Airdate: Feb. 1, 1968)" and classified as matching season 2, episode 18 of the show "Star Trek", may augment its search index entry with a full episode recap of season 2, episode 18 of "Star Trek".

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. An apparatus comprising:
memory;
instructions; and
one or more processors to execute the instructions to:
extract, from a first website hosting a video, first metadata associated with the video hosted by the first website;
process the extracted first metadata associated with the video to identify the video as corresponding to an episode of a television show, wherein processing the extracted first metadata includes (i) based on a first identifier of the first website, selecting a first set of rules for parsing the extracted first metadata extracted from the first website and (ii) parsing the extracted first metadata according to the selected first set of rules to obtain a name of the episode;
update a database to include first information comprising the name of the episode of the television show obtained based on the parsing of the first metadata;
extract, from a second website, second metadata associated with the video;
process the extracted second metadata to determine second information about the episode of the television show, wherein processing the extracted second metadata includes (i) based on a second identifier of the second website, selecting a second set of rules for parsing the extracted second metadata extracted from the second website and (ii) parsing the extracted second metadata according to the selected second set of rules to determine the second information about the episode of the television show; and
augment the database with the determined second information about the episode of the television show.

2. The apparatus of claim 1, further including the database, and wherein the one or more processors are to:
process a query to the database, the query associated with the episode of the television show; and
return, based on the query, a combination of the first information and the second information from the database.

3. The apparatus of claim 1, wherein:
the first metadata includes a name of the television show, the name of the episode of the television show, and an airdate of the episode of the television show; and
the second metadata includes a description of the episode of the television show.

4. A tangible machine readable storage disk or storage device comprising instructions which, when executed, cause one or more processors to at least:
extract, from a first website hosting a video, first metadata associated with the video hosted by the first website;
process the extracted first metadata associated with the video to identify the video as corresponding to an episode of a television show, wherein processing the extracted first metadata includes (i) based on a first identifier of the first website, selecting a first set of rules for parsing the extracted first metadata extracted from the first website and (ii) parsing the extracted first metadata according to the selected first set of rules to obtain a name of the episode;
update a database to include first information comprising the name of the episode of the television show obtained based on the parsing of the first metadata;
extract, from a second website, second metadata associated with the video;
process the extracted second metadata to determine second information about the episode of the television show, wherein processing the extracted second metadata includes (i) based on a second identifier of the second website, selecting a second set of rules for parsing the extracted second metadata extracted from the second website and (ii) parsing the extracted second metadata according to the selected second set of rules to determine the second information about the episode of the television show; and augment the database with the determined second information about the episode of the television show.

5. The tangible machine readable storage disk or storage device of claim 4, wherein the instructions cause the one or more processors to:
process a query to the database, the query associated with the episode of the television show; and
return, based on the query, a combination of the first information and the second information from the database.

6. The tangible machine readable storage disk or storage device of claim 4, wherein:
the first metadata includes a name of the television show, name of the episode of the television show, and an airdate of the episode of the television show; and
the second metadata includes a description of the episode of the television show.

7. A method comprising:
extracting, from a first website hosting a video, first metadata associated with the video hosted by the first website;
processing, by executing an instruction with one or more processors, the extracted first metadata associated with the video to identify the video as corresponding to an episode of a television show, wherein processing the extracted first metadata includes (i) based on a first identifier of the first website, selecting a first set of rules for parsing the extracted first metadata extracted from the first website and (ii) parsing the extracted first metadata according to the selected first set of rules to obtain a name of the episode;
updating, by executing an instruction with the one or more processors, a database to include first information comprising the name of the episode of the television show obtained based on the parsing of the first metadata;
extracting, by executing an instruction with the one or more processors, second metadata associated with the video;
processing, by executing an instruction with the one or more processors, the extracted second metadata to determine second information about the episode of the television show, wherein processing the extracted second metadata includes (i) based on a second identifier of the second website, selecting a second set of rules for parsing the extracted second metadata extracted from the second website and (ii) parsing the extracted second metadata according to the selected second set of rules to determine the second information about the episode of the television show; and
augmenting, by executing an instruction with the one or more processors, the database with the determined second information about the episode of the television show.

8. The method of claim 7, further including:
processing a query to the database, the query associated with the episode of the television show; and
returning, based on the query, a combination of the first information and the second information from the database.

9. The method of claim 7, wherein:
the first metadata includes a name of the television show, the name of the episode of the television show, and an airdate of the episode of the television show; and
the second metadata includes a description of the episode of the television show.

10. An apparatus comprising:
means for extracting, from a first website hosting a video, first metadata associated with the video hosted by the first website;
means for processing the extracted first metadata associated with the video to identify the video as corresponding to an episode of a television show, wherein processing the extracted first metadata includes (i) based on a first identifier of the first website, selecting a first set of rules for parsing the first metadata extracted from the first website and (ii) parsing the extracted first metadata according to the selected first set of rules to obtain a name of the episode;
means for updating a database to include first information comprising the name of the episode of the television show obtained based on the parsing of the first metadata; and
means for extracting, from a second website, second metadata associated with the video;
means for processing the extracted second metadata to determine second information about the episode associated with the television show, wherein processing the extracted second metadata includes (i) based on a second identifier of the second website, selecting a second set of rules for parsing the extracted second metadata extracted from the second website and (ii) parsing the extracted second metadata according to the selected second set of rules to determine the second information about the episode of the television show; and
means for augmenting the database with the determined second information about the episode of the television show.

11. The apparatus of claim 10, further including the database, and means for searching to:
process a query to the database, the query associated with the episode of the television show; and
return, based on the query, a combination of the first information and the second information from the database.

12. The apparatus of claim 10, wherein:
the first metadata includes a name of the television show, the name of the episode of the television show, and an airdate of the episode of the television show; and
the second metadata includes a description of the episode of the television show.

* * * * *